(No Model.)
H. F. BAKER.
Seed Planter.
No. 234,650. Patented Nov. 23, 1880.
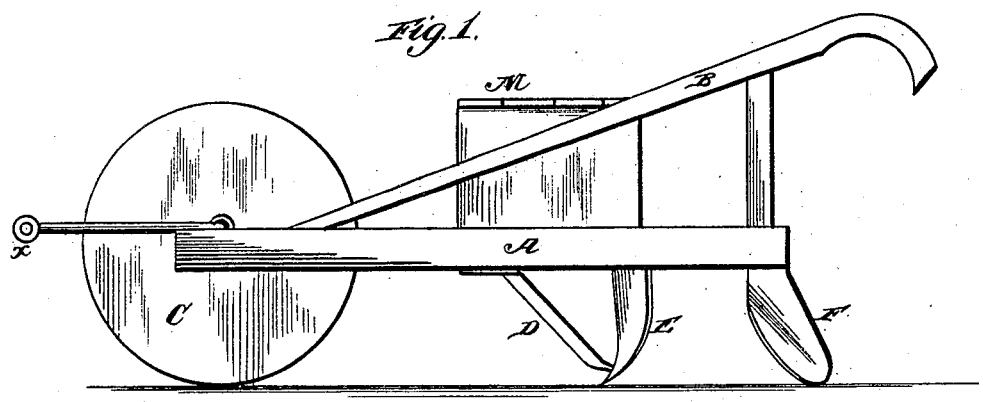
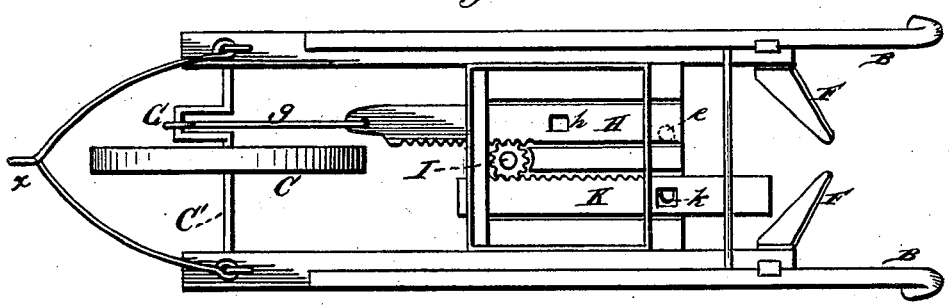
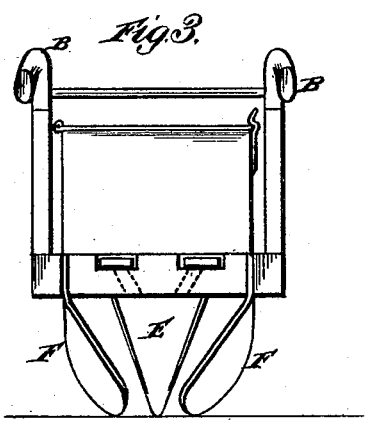
WITNESSES
Robert Ewatt
N Clay Smith
By his Attorney
INVENTOR
Henry F. Baker
H. F. Ernst

UNITED STATES PATENT OFFICE.

HENRY F. BAKER, OF DILLSBOROUGH, INDIANA, ASSIGNOR OF ONE-HALF TO JOHN N. CALVERT, OF SAME PLACE.

SEED-PLANTER.

SPECIFICATION forming part of Letters Patent No. 234,650, dated November 23, 1880.

Application filed August 23, 1880. (No model.)

*To all whom it may concern:*

Be it known that I, HENRY F. BAKER, a citizen of the United States, residing at Dillsborough, in the county of Dearborn and State of Indiana, have invented certain new and useful Improvements in Seed Droppers or Planters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to planters for corn or other seed; and the novelty consists in the construction and arrangement of parts, as will be more fully set forth hereinafter, and pointed out in the claim.

The object of the invention is to secure a certain intermittent depositing of the seed or grain in the drill, and it is accomplished by the devices set forth in the accompanying drawings, which form a part of this specification, and in which—

Figure 1 represents a side elevation, Fig. 2 a plan view, and Fig. 3 an end elevation from the rear.

Referring to the drawings, A represents the main frame or beams, in which is journaled the shaft of the riding-wheel C, and B represents the handles. The driving or operating portion is component with the shaft C', which has a crank portion, G, to which is loosely secured a link, g, connected loosely with a rack-bar, H, which forms one of the seed-bars, and said bar H receives from the propulsion of the complete device a reciprocating motion, as is obvious.

K represents a rack-bar, which also serves as a feed or seed bar, and the ratchets or cogs face each other. A pinion, I, operates between the rack-bars H and K to give the proper reciprocating motion.

The operating reciprocating seed-bar H and the operated seed-bar K are provided, respectively, with feed-apertures $h$ and $k$, through which the seed to be planted is fed to the drill made by the plow E. This plow is constructed of thin plate metal, and is held or braced by the support or tie D, as shown, which also serves as a colter to cut the furrow or sod. The seed-apertures $h$ and $k$ are inclined in opposite directions, so as to deposit the seed in the rear of the shovel E.

It will, of course, be understood that the seed-bars operate in the bottom of a seed-box or hopper, and that the drill is covered by the coverers F.

With my device a certain arbitrary depositing of the seed at regular intervals is assured, and from the foregoing description the operation of the machine must be obvious.

I am aware seed-planters having parallel feed or seed bars are old, and such I do not desire to claim, broadly.

What I claim as new, and desire to secure by Letters Patent, is—

In a walking seed-planter, the wheel C, crank G, connecting-rod $g$, and ratcheted seed-slides H and K, in combination with the central pinion, I, for imparting an intermittent reciprocating movement to the seed-slides, substantially as shown and described.

In testimony whereof I affix my signature in presence of two witnesses.

HENRY F. BAKER.

Witnesses:
FRANCIS M. MILES,
VAN S. B. CROWLEY.